United States Patent Office 3,388,990
Patented June 18, 1968

3,388,990
METHOD OF PREVENTING THE CAKING OF SUBSTANCES APT TO CAKE
Iwao Maruta and Akihiko Iida, Chiba, Japan, assignors to Kao Soap Company, Ltd., Tokyo, Japan, a corporation of Japan
No Drawing. Filed Apr. 26, 1965, Ser. No. 451,007
Claims priority, application Japan, June 20, 1964, 39/34,305
9 Claims. (Cl. 71—64)

ABSTRACT OF THE DISCLOSURE

A method of preventing caking of a substance apt to cake comprising applying to the said substance an aqueous solution, a synthetic high polymer and a surface active agent, and drying the substance. The dried substance has a branched configuration and a relatively large specific volume. The polymer and surface active agent are applied to the substance in the range of 0.001 to 0.5% by weight of the substance.

---

This invention relates to methods of preventing the caking or agglomerating of substances apt to cake, such as fertilizer substances, including specifically urea, ammonium nitrate, ammonium phosphate, ammonium sulphate, ammonium chloride, potassium chloride, superphosphate of lime and mixtures, thereof.

The present invention is especially effective for treating urea.

It is known that granular, powdery, or crystallized fertilizer substances are apt to cake while stored either in bulk or in packages. Various methods have been attempted to overcome this disadvantage. It has already been suggested to use anti-caking agents including (1) fine powdery inorganic compounds, including diatomaceous earth, clay, gypsum, bentonite, kaolin, aluminum hydroxide, silicates such as magnesium silicate, and calcium carbonate, (2) cationic surface active agents such as imidazoline derivatives substituted in the 1,2-position with a proper radical and (3) anionic surface active agents such as sodium dodecyl benzene sulphonate. It has also been suggested to add a urea formaldehyde resin to the substance. Also, it has been suggested to form a resin on the surface of the substance by making urea react with formaldehyde. However, in such known anti-caking methods, there are various disadvantages. For example, the anti-caking effect may be low so that large amounts of the anti-caking substance must be added. Moreover, the nitrogen content in nitrogen series fertilizers may be reduced. Also, a long time is required for the treatment and the processes are costly.

An object of the present invention is to provide an anti-caking method superior to known conventional methods.

Other objects and advantages of the present invention will be made clear to persons having an ordinary knowledge in this technical field in the following disclosure and explanation.

According to the present invention, a small amount of an aqueous solution, consisting of a synthetic high polymer compound and a surface active agent, is added as an anti-caking agent to a substance apt to cake and then the greater part of the water is removed.

The synthetic high polymer compound used in the present invention may be substantially insoluble or soluble in water.

The synthetic high polymer compounds substantially insoluble in water used in the present invention comprise substantially water-insoluble vinyl series high polymers, such as polyvinyl acetate. The water insoluble, synthetic, high polymer compound is dissolved in a concentrated solution of a surface active agent in advance. This solution of the substantially water-insoluble vinyl series high polymer dissolved in the surface active agent can then be easily diluted with water. In the present application, the water-insoluble vinyl series high polymer made water-soluble as above described shall be called a "water-solubilized high polymer."

Therefore, the present invention relates to a method of reducing or completely eliminating the caking property of substances apt to cake in which a water-solubilized high polymer or a mixed solution of a water-soluble synthetic high polymer compound and a surface active agent is added as an anti-caking agent to a substance apt to cake.

The method according to the present invention is far more effective than any conventional method wherein a high polymer compound or a surface active agent is singly used as an anti-caking agent.

Further, most of the high polymer compounds applicable to the present invention are already industrially mass-produced today and are available cheaply. The same thing can be said of the surface active agents.

In carrying out the present invention, the water-solubilized high polymer used can be a vinyl series high polymer water-solubilized not only in a concentrated aqueous solution of a susrface active agent but also in an organic solvent.

The vinyl series high polymer so called here is a polymer of at least three units of monomers represented by the general formula:

wherein Y is a hydrogen atom or a methyl radical and X is a chlorine atom, a hydroxyl radical or its acetal or ester, a carboxyl radical or its ester or amide, a pyrrolidyl radical, a pyridyl radical or a phenyl radical.

For the water-insoluble high polymers that can be used, there can be enumerated polyvinyl acetate, its partially saponified products which are insoluble in water, acetals of polyvinyl alcohols such as formal, acetal and butyral, acrylic acid and methacrylic acid derivatives (including partially hydrolyzed derivatives so long as they are insoluble in water) such as dodecyl acrylate and methyl methacrylate and fatty acid polyvinyl esters such as polyvinyl propionate.

According to investigations made by us, high polymers consisting of only styrene, acrylonitrile and vinyl chloride or the like cannot be water-solubilized even with a concentrated solution of a surface active agent. Further, monomers which will singly produce water-soluble high polymers, such as vinyl pyrrolidone and acrylic acid amide can be used if they are copolymerized with vinyl acetate or the like. In the same manner, high polymers insoluble in water such as a copolymer of α,β-unsaturated fatty acids, such as maleic anhydride, and vinyl acetate or the like also can be used.

In the present invention, there can be used various anionic surface active agents to water-solubilize vinyl series high polymers. Typical of them are sulphates of higher alcohols such as sodium dodecyl sulphate, alkyl aryl sulphonates such as sodium dodecyl benzene sulphonate and sodium butyl naphthalene sulphonate, fatty acid salts such as sodium palmitate and sodium abietate and resin acid soaps. Further, there can be used sulphates of nonionic surface active agents, such as sodium polyoxyethylene nonylphenol sulphate, alkyl sulphosuccinates such as sodium dioctyl sulphosuccinate and alkyl sulphonates such as sodium dodecyl sulphonate. Needless to say, mixtures of them also may be used. These anionic surface active agents also can be used together with the water-soluble high polymers in the present invention as described later.

For the water-soluble synthetic high polymers applicable to the present invention there can be enumerated water-soluble vinyl series polymers such as polyvinyl alcohol, polyvinyl pyrrolidone, polyacrylic acid and its salts, polyacrylamide, polyvinyl sulphonic acid and its salts, polyvinyl methyl ether and polymethacrylic acid and its salts, water-soluble condensate series polymers such as urea-formaldehyde resins, melamine-formaldehyde resins, polyethylene oxide, polypropylene oxide and polyethylene imine, water-soluble copolymers such as maleic acid-vinyl acetate, maleic acid-styrene, maleic acid-acrylic acid, maleic acid-methacrylic acid, maleic acid-acrylamide, maleic acid-methyl vinyl ether, vinyl sulphonic acid-vinyl acetate, vinyl sulphonic acid-acrylic acid, vinyl sulphonic acid-methacrylic acid, vinyl sulphonic acid-acrylamide, vinyl pyrrolidone-vinyl acetate and vinyl pyrrolidone-acrylamide and water-soluble derivatives of natural high polymers, such as carboxy methyl cellulose and methyl cellulose. These water-soluble synthetic high polymers are used singly or as a mixture of two or more of them.

Further, an increased anti-caking effect can be obtained when a water-soluble synthetic polymer is used with a urea-formaldehyde resin in the present invention. This phenomenon will be exemplified in the following Examples 6 and 7.

For the surface active agents to be used together with the above-mentioned water-soluble high polymers, there can be enumerated known anionic surface active agents such as fatty acid salts, resin acid salts, higher alcohol sulphates, alkyl benzene sulphonates, alkyl naphthalene sulphonates, long chain olefin sulphates, dialkyl sulphosuccinates, alkyl phosphates and polyoxyethylene sulphates, known nonionic surface active agents such as polyoxyethylene alkyl ethers, polyoxyethylene alkyl phenyl ethers, sorbitane fatty acid esters, polyoxyethylene sorbitane fatty acid esters, polyoxyethylene acyl esters, oxyethylene-oxypropylene block polymers and fatty acid monoglycerides, known cationic surface active agents such as alkyl amine salts, quaternary ammonium salt and polyoxyethylene alkyl amines and amphoteric surface active agents such as an alkyl betaine type. They are used singly or as a mixture of two or more of them.

Such water-soluble synthetic high polymers and surface active agents as are mentioned above can be freely combined. However, the combined use of a high polymer which gives an anionicity as, for example, sodium polyacrylate and a surface active agent giving as cationicity produces a precipitate and is therefore ineffective. Needless to say, any other similar combination is also improper.

As is well known, when a saturated aqueous solution of urea is cooled or water in urea is evaporated and dispersed, crystals will be obtained. The size and shape of the crystals can be varied according to the conditions. However, the apparent specific volume of urea made in the form of powder or grains the length of whose maximum side is less than 2 mm. or crushed to be of such size, is less than 2.7 cc./g.

On the other hand, when a solution of a water-solubilized high polymer in the present invention or a mixed solution of a water-soluble synthetic high polymer and a surface active agent is added in an amount larger than when used as an anti-caking agent to urea and the greater part of the water is removed, there will be obtained urea in a state in which fine crystals of about 0.1 mm. in diameter and about 2 to 3 mm. long or smaller are assembled in the form of branches. Its apparent specific volume is very large so that it is, for example, more than 6.0 cc./g. as passed through a sieve of whose mesh size is about 2000 microns.

The apparent specific volume so called here is the apparent volume in cc. per gram of a substance to be measured and is represented by the reciprocal number of a value obtained by "The Measurement of Apparent Specific Gravities" in "International Organization for Standardization Technical Committee—91—Surface Active Agents—Method of Sampling and Testing Detergent 20."

Now this phenomenon shall be further exemplified and explained. When a saturated solution of urea is prepared and is left in an uncovered state in a room low in humidity at about 25° C., upon the evaporation of water, crystals of urea 1 to 2 mm. wide, about 0.5 mm. thick and 7 to 8 cm. long will be deposited. In such case, the size of the crystals will be different depending on the evaporating velocity of water and the purity of the urea. However, in any case the thus obtained crystals are large. When they are crushed coarsely and are passed through a sieve of a mesh size of 2000 microns, their apparent specific volume will be less than 2.7 cc./g. as mentioned above.

If a small amount of a surface active agent such as, for example, sodium dodecyl sulphate is added to the saturated urea solution, upon the evaporation of water, a creeping phenomenon will appear and the crystals of urea will be produced in the part of the vessel not wetted with the solution. The thus produced crystals are sometimes a group of small needle crystals, are quite hard and are not so much developed in shape as to be in the form of branches. Therefore, their apparent specific volume is small as, for example, 3.0 cc./g.

Further, even if polyvinyl pyrrolidone, polyvinyl alcohol, methyl cellulose or any other water-soluble high polymer is added to the solution of urea, urea crystals of such large apparent specific volume as in the present invention will not be obtained.

On the other hand, when a mixture of a water-soluble high polymer such as polyvinyl pyrrolidone, polyvinyl alcohol, an alkyl cellulose or polyvinyl alkyl ether and a surface active agent or a water-solubilized high polymer is made to act on urea in the presence of water and then the greater part of the water is removed, a large amount of urea in the form of many branches grown to be 1 to 8 cm. high will be obtained. Therefore, when it is crushed coarsely and is passed through a sieve of mesh size of 2000 microns, its apparent specific volume will be increased, so as to be from 6.0 to 15.0 cc./g.

According to our findings, such phenomenon is peculiarly the result of using a water-solubilized high polymer solution or a mixed solution of the water-soluble synthetic high polymer and surface active agent according to the present invention. Any water-solubilized high polymer can have its apparent specific volume made large and can be used as an anti-caking agent according to the present invention.

The water-solubilized high polymer is a vinyl series high polymer which is inherently insoluble in water and it is made soluble by its mutual action with a surface active agent. It is therefore considered that the combination of a high polymer and a surface active agent in the present invention is high in the mutual action of its components and that only the mixed solution of the high polymer and surface active agent of such combination makes the apparent specific volume large and provides the action of preventing the caking of substances apt to cake.

The procedure for adding a mixed solution of a synthetic high polymer and a surface active agent in the present invention is the same as that used for adding a conventional anti-caking agent. For example, the mixed solution can be added to the raw material or to the slurry during the deposition of crystals. However, the easiest and most effective method is to spray a mixed aqueous solution of a high polymer and a surface active agent on the surface of a substance to be treated which substance is in the form of a powder, crystals or grains.

It is desirable to spray the anti-caking agent of the present invention when the substance to be treated is hot. In such case, in order to increase the efficiency of the spray, it is preferable to spray the agent through fine sprays or jets of a standard construction while the substance to be treated is being conveyed on a conveyor belt or is dropping in the form of a stream from a conveyor or the like source.

Various methods can be devised for preparing solutions of water-solubilized high polymers. One acceptable method involves preparing a concentrated solution (of less than 15% by weight of surface active agent generally depending on the solubility of the surface active agent) of an anionic surface active agent and then gradually adding a fixed amount of a water-insoluble high polymer to the solution with stirring and while the solution is heated as required. A further method involves preparing an emulsion latex by diluting a water-insoluble high polymer, such as a concentrated polyvinyl acetate emulsion latex, with water so as to form a solution containing about 5% to 10% of the polymer. The solution is then made into a transparent aqueous solution by adding a fixed amount of an anionic surface active agent while warming the solution as required.

Further, various methods of preparing mixed aqueous solutions of water-soluble high polymers and surface active agents can be devised. A convenient method involves preparing a concentrated solution (of less than 15 weight percent surface active agent generally depending on the solubility of the surface active agent) of a surface active agent and then adding a fixed amount of a water-soluble high polymer. A further method involves preparing an aqueous solution of a water-soluble high polymer and an aqueous solution of a surface active agent separately and then mixing the solutions together.

In case an aqueous solution of an anti-caking agent according to the present invention is to be added to a substance to be treated, it will be preferred to dilute the solution to 0.1 to 10 weight percent of the anti-caking ingredients or preferably to 1% to 5%.

In carrying out the present invention, a sufficient anti-caking effect will be achieved by the addition of about 0.001 to 0.5 percent by weight of both the synthetic high polymer and surface active agent per part of the substance to be treated. However, a larger amount of addition also may be used. A mixing ratio, by weight, of the high polymer and the surface active agent of within the range of 1:10 to 10:1 is effective. Specifically, 2 to 5 parts by weight of a high polymer and 8 to 5 parts by weight of a surface active agent are preferable.

The present invention shall now be explained with reference to examples.

Example 1

Polyvinyl alcohol (abbreviated as PVA), carboxymethyl cellulose (CMC), methyl cellulose (MC), polyvinyl pyrrolidone (PVP), polyacrylamide (PAM), sodium polyacrylate (PAA-Na) sodium polyvinyl sulphonate (PVS-Na) and polyethylene glycol of an average molecular weight of 4000 (PEG—4000) were used as water-soluble synthetic high polymers. Sodium dodecyl sulphate, lauryl trimethyl ammonium chloride, polyoxyethylene lauryl ether ($\bar{P}=10$) and lauryl betaine were used as surface active agents. Three g. of a 0.5% aqueous solution of the water-soluble synthetic high polymer and 3 g. of a 0.5% aqueous solution of the surface active agent were mixed together. Each of the thus mixed solutions was uniformly sprayed on 100 g. of urea which passed through a 40 mesh screen. The urea was dried at a relative humidity of 60% to 70% at 30° C. for two days and was then crushed. Forty to 80 mesh size grains of the thus treated urea were separated by sieving and were put into a box made of filter paper and measuring 7 x 4 x 20 cm. and were left at a relative humidity of 80% at 20° C. for two days. Thirty g. of the urea were molded under a load of 100 kg. for ten minutes in a cylindrical mold 4.5 cm. in diameter. The molding was broken with a specifically made breaking device. The degree of caking was compared by measuring the load required for the break. For comparison purposes, the same procedure was carried out using the respective materials named above, used individually.

The effects of preventing the caking of urea by the combined use of respective water-soluble synthetic high polymers and surface active agents are shown in the following:

TABLE 1.—EFFECTS OF PREVENTING THE CAKING OF UREA BY RESPECTIVE SURFACE ACTIVE AGENTS AND WATER-SOLUBLE SYNTHETIC HIGH POLYMERS USED ALONE

| Surface active agents | Breaking load in kg. | Water-soluble synthetic high polymer | Breaking load in kg. |
|---|---|---|---|
| Not added | 2.5 | PVA | 1.7 |
| Sodium dodecyl sulphate | 1.5 | CMC | 1.8 |
| Lauryl trimethyl ammonium chloride. | 1.3 | MC | 2.0 |
| Polyoxyethylene lauryl ether ($\bar{P}=10$). | 1.7 | PVS-Na | 2.1 |
| Lauryl betaine | 1.6 | PVP | 1.7 |
| Polyoxyethylene lauryl ether ($\bar{P}=10$)-sodium dodecyl sulphate (1:1). | 1.5 | PAM | 2.0 |
|  |  | PAA-Na | 2.1 |
|  |  | PEG—4000 | 1.8 |
|  |  | PVA-CM (1:1) | 1.8 |

TABLE 2.—EFFECTS OF PREVENTING THE CAKING OF UREA BY THE COMBINED USE OF RESPECTIVE SURFACE ACTIVE AGENTS AND WATER-SOLUBLE SYNTHETIC HIGH POLYMERS

[Breaking load in kg.]

|  | Sodium dodecyl sulphate | Lauryl Trimethyl ammonium chloride | Polyoxyethylene lauryl ether ($\bar{P}=10$) | Lauryl betaine | Polyoxyethylene lauryl ether ($\bar{P}=10$)-sodium dodecyl sulphate |
|---|---|---|---|---|---|
| PVA | 0.4 | 0.5 | 0.5 | 0.6 |  |
| CMC | 0.4 | 0.6 | 0.6 |  | 0.5 |
| MC | 0.5 | 0.7 | 0.6 |  |  |
| PVS-Na | 0.8 | 0.5 | 0.5 |  |  |
| PVP | 0.7 |  |  |  |  |
| PAM | 0.9 |  |  |  |  |
| PAA-Na | 0.9 |  |  |  |  |
| PEG—4000 | 0.6 |  |  |  |  |
| PVA-CMC | 0.4 |  |  |  | 0.4 |

As is evident from Tables 1 and 2, a remarkable increase of the anticaking capacity is brought about by the combined use of the surface active agents and water-soluble synthetic high polymers.

Example 2

A mixed solution of 3 g. of a 0.5% aqueous solution of a water-soluble synthetic high polymer and 3 g. of a 0.5% aqueous solution of a surface active agent was uniformly sprayed on 100 g. of each of ammonium sulphate and ammonium phosphate of less than 40 mesh size. Then the treated materials were dried and were passed through a sieve of 20 mesh size. Fifty g. of the materials were put into boxes made of filter paper and measuring 7 x 4 x 20 cm. They were left under a load of 300 g. in a room at a relative humidity of 80% at room temperature for 12 days and were separated by sieving with a sieve of 20 mesh size. The rate of passing of the material through the sieve was taken as an index of the anti-caking effect or an anti-caking rate. The effects of preventing the caking of ammonium sulphate and ammonium phosphate by the combined use of the respective water-soluble high polymers and surface active agents are shown in the following:

TABLE 3

| Anti-caking agents | Anti-caking rate in percent | |
|---|---|---|
| | Ammonium sulphate | Ammonium phosphate |
| Not added | 32 | 50 |
| Sodium dodecyl sulphate | 56 | 55 |
| PVA | 43 | 45 |
| Sodium dodecyl sulphate-PVA | 92 | 90 |
| Sodium dodecyl benzene sulphate | 51 | 48 |
| CMC | 37 | 45 |
| Sodium dodecyl benzene sulphonate-CMC | 88 | 92 |
| Sodium butyl naphthalene sulphonate | 47 | 52 |
| MC | 42 | 50 |
| Sodium butyl naphthalene sulphonate-MC | 78 | 86 |
| Lauryl trimethyl ammonium chloride | 72 | 74 |
| Lauryl trimethyl ammonium chloride-PVA | 86 | 85 |
| Polyoxyethylene lauryl ether ($\bar{P}$=10) | 51 | 60 |
| Polyoxyethylene lauryl ether ($\bar{P}$=10)-PVA | 83 | 98 |

The abbreviations in the table are the same as in Example 1.

Example 3

Five g. of 0.5% aqueous solutions of the respective water-solubilized high polymers were sprayed on 100 g. of urea which was in the form of small crystals. The water was then evaporated and the crystals were dried. Fifty g. of each sample were put into a box made of chemical filter paper and measuring 10 cm. long, 6 cm. wide and 4 cm. deep and the boxes were placed in an atmosphere at a humidity of 80% for three days. A glass plate was then placed on the sample. A weight of 500 g. was placed on the glass plate to press the sample. The sample was thus left in a room at a humidity of 60% at 30° C. for ten days. The caked urea was shaped to form a block of 2 x 2 x 1 cm. and a load was applied to it to break the cake. The load required to break the cake was taken as an index of caking.

The effects of using various water-solubilized high polymers are listed in Table 4. Further, for information and comparison, there are listed the effects of using cationic surface active agents and polyvinyl acetate (emulsion), already known as anti-caking agents, as well as the surface active agents used to prepare the water-solubilized high polymers.

TABLE 4

| Article name: | Load in kg. |
|---|---|
| Not added | 4.5 |
| Coatamine 24 P [1] | 4.5 |
| Farmine 86 [2] | 3.7 |
| Acetamine | 3.6 |
| PVAc—Pelex NB [3] | 1.2 |
| PVAc—ABS [4] | 2.7 |
| AM.PVAc—Rosin soap [5] | 2.0 |
| PVF—Pelex NB [6] | 0.4 |
| Polyvinyl acetate emulsion | 3.7 |
| Rosin soap | 3.8 |
| Pelex NB | 3.5 |

[1] Coatamine 24 P: Trade name of an alkyl trimethyl ammonium chloride series surface active agent produced by Kao Soap Company, Ltd., Japan.
[2] Farmine 86: Trade name of an alkyl primary amine series surface active agent produced by Kao Soap Company, Ltd., Japan.
[3] PVAc-Pelex NB: A water-solubilized high polymer consisting of 8 parts by weight of high polymer polyvinyl acetate and 10 parts by weight of active agent Pelex NB (trade name of sodium butyl naphthalene sulphonate series surface active agent produced by Kao Soap Company, Ltd., Japan).
[4] PVAc-ABS: A water-solubilized high polymer consisting of 3.2 parts by weight of high polymer polyvinyl acetate and 10 parts by weight of active agent sodium dodecyl benzene sulphonate.
[5] AM.PVAc-rosin soap: A water-solubilized high polymer consisting of 5 parts by weight of a high polymer copolymer of methyl acrylate and polyvinyl acetate at a ratio of 1:1 and 15 parts by weight of active agent rosin soap.
[6] PVF-Pelex NB: A water-solubilized high polymer consisting of 2.5 parts by weight of high polymer polyvinyl formal and 15 parts by weight of active agent Pelex NB.

As is seen in Table 4, the anti-caking effect of using the water-solubilized high polymer is far higher than when no anti-caking agent is used, or when a cationic surface active agent which is a known conventional anti-caking agent is used, or when an anionic surface active agent to produce the water-solubilized high polymer is used and is evidently higher than when a polyvinyl acetate emulsion is used.

Example 4

Various amounts of a water-solubilized high polymer consisting of 3.2 parts by weight of a high polymer comprised of polyvinyl acetate and 10 parts by weight of a surface active agent comprised of sodium dodecyl sulphate were added to small crystals of urea of less than 40 mesh size. The effects of preventing the caking of urea were measured. The experimenting method and conditions were the same as in Example 2. The results are shown in Table 5. Further, for information, the effect of using only sodium dodecyl sulphate (SDS) is also listed.

TABLE 5

| Amounts of the water-solubilized high polymer | Load in kg. | SDS | Load in kg. |
|---|---|---|---|
| Not added | 5.0 | Not added | 5.0 |
| 0.005% | 1.0 | 0.005% | 2.9 |
| 0.010% | 0.7 | 0.010% | 1.4 |
| 0.025% | 0.5 | 0.025% | 1.3 |
| 0.035% | 0.4 | 0.035% | 0.9 |
| 0.050% | 0.4 | 0.050% | 0.9 |

It can be seen from Table 5 that, when a small amount of the water-solubilized high polymer is used, a higher anti-caking effect is achieved than when SDS alone is used. Even if relatively large amounts of both are used, their anti-caking effects will not increase, but in any case the load for the water-solubilized high polymer in such case will be less than ½ of the load in the case of SDS alone. These facts show that not only the water-solubilized high polymer of the present invention is as effective as an anti-caking agent when used in a small amount, but also its anti-caking effect is high.

Example 5

Six g. of a 0.5% solution of an anti-caking agent were uniformly sprayed on 100 g. of each of ammonium sulphate and ammonium phosphate of less than 40 mesh size. The materials were dryed and then passed through a sieve of 20 mesh size. Fifty g. of the materials were put into a paper box in the same manner as is mentioned in Example 3 and were pressed with a glass plate. A load of 300 g. was applied to them. They were left in a room at a humidity of 80% at room temperature for 12 days and were then separated by sieving with a sieve of 20 mesh size. Their rate of passing through the sieve was taken as an index of the anti-caking effect or the anti-caking rate. The water-solubilized high polymers that were used and their effects are shown in Table 6. For information, the results of using known conventional cationic surface active agents used alone also are given.

TABLE 6

| Anti-caking agents | Anti-caking rate in Percent | |
|---|---|---|
| | Ammonium Sulphate | Ammonium Phosphate |
| Not added | 30 | 55 |
| Pelex NB | 41 | 60 |
| SDS | 53 | 50 |
| Coatamine 24 P | 77 | 70 |
| PVAc-Pelex NB | 94 | 85 |
| PVAc-SDS | 82 | 79 |

It will be apparent from Table 6 that the water-solubilized high polymers are more effective as anti-caking agents than the already known conventional cationic and anionic surface active agents.

Example 6

Various amounts of a solution of an anti-caking agent, which was obtained by adding various amounts of a urea-formaldehyde solution (abbreviated as UF) to a composition of polyvinyl alcohol and sodium dodecyl sulfate (abbreviated as PVA-SDS, PVA:SDS ratio in weight =1.3), were sprayed on 100 g. of urea of less than 40 mesh size and were mixed uniformly by stirring. The urea thus treated was dried for two hours at 105° C. It was then crushed to below 40 mesh size. The samples were put into a box made of chemical filter paper as described in Example 3 and were left at a humidity of 80% for a day. Thirty g. of each sample thus obtained were molded to tablets under a load of 100 kg. for ten minutes. The load required for breaking each tablet was measured.

Further, the amount of moisture absorption was measured by the following formula:

Amount of moisture absorption=

$$\frac{\text{Weight of urea before drying} - \text{Weight urea after 105° C., 2 hrs. drying}}{\text{Weight of urea}} \times 100$$

The results are shown in Table 7.

TABLE 7

| Amounts of the anti-caking agent (percent) | | Presence (o) or non-presence (x) of urea crystals in the form of branches after 105° C., 2 hrs. drying | Amount of moisture absorption (percent) | Breaking load (kg.) |
|---|---|---|---|---|
| UF | PVA-SDS | | | |
| 0 | 0 | x | 0.18 | 6.5 |
| 0 | 0.005 | x | 0.19 | 5.9 |
| | 0.03 | o | 0.3 | 3.6 |
| | 0.06 | o | 0.27 | 3.7 |
| 0.06 | 0 | x | 0.38 | 4.1 |
| | 0.005 | x | 0.46 | 2.7 |
| | 0.03 | o | 0.26 | 2.8 |
| | 0.06 | o | 0.22 | 3.4 |
| 0.13 | 0 | x | 0.54 | 3.2 |
| | 0.005 | x | 0.54 | 3.0 |
| | 0.03 | o | 0.56 | 1.9 |
| | 0.06 | o | 0.57 | 2.2 |
| 0.19 | 0 | x | 0.68 | 2.8 |
| | 0.005 | x | 0.81 | 2.2 |
| | 0.03 | o | 0.99 | 1.7 |
| | 0.06 | o | 0.30 | 1.9 |
| 0.32 | 0 | x | | 2.7 |
| | 0.005 | x | 0.43 | 1.9 |
| | 0.03 | o | 0.99 | 1.5 |
| | 0.06 | o | 1.1 | 1.8 |
| 0.51 | 0 | x | 0.68 | 2.1 |
| | 0.005 | x | 0.81 | 2.6 |
| | 0.03 | | 0.75 | 1.3 |
| | 0.06 | o | 0.8 | 2.1 |

From these experimental results, it will be seen that the use of UF in combination with PVA-SDS increases considerably the anti-caking property of urea.

Example 7

Various compositions of water-soluble high polymers and surface active agents listed in the following Table 8 were prepared in a weight ratio of 1:3 and these compositions were added in an amount of 0.03% (wt.) to urea. Further, a urea-formaldehyde resin (UF) was added in an amount of 0.2% to urea, when UF was used together with other water-soluble high polymers. The urea samples treated by these anti-caking agents were dried for two hours at 105° C., crushed to below 40 mesh, put into a box made of chemical filter paper as described in Example 3 and left at a humidity of 80% for a day. Thirty g. of each sample were molded to tablets under a load of 100 kg. for ten minutes. The load required for breaking each tablet was measured.

The results are shown in Table 8.

The embodiments of the invention in which an exclusive property or privilege is claimed are defined as follows:

1. A method of preventing the caking of substances apt to cake selected from the group consisting of urea, ammonium nitrate, ammonium phosphate, ammonium sulphate, ammonium chloride, potassium chloride, superphosphate of lime and mixtures thereof, which comprises:
   applying to said substance an aqueous solution of an anti-caking agent selected from the group consisting of
   (A) a water-solubilized high polymer obtained by dissolving in a concentrated solution of an anionic surface active agent a substantially water-insoluble vinyl series high polymer selected from the group consisting of polyvinyl acetate, its partially saponified products insoluble in water, and acetals of 1 to 4 carbon atoms of polyvinyl alcohols, and
   (B) a mixed aqueous solution consisting of a surface active agent and a water-soluble synthetic high polymer selected from the group consisting of polyvinyl alcohol, polyvinyl pyrrolidone, polyacrylic acid and its salts, polyacrylamide, polyvinyl sulphonic acid and its salts, polyvinyl ether, polymethacrylic acid and its salts, water-soluble urea-formaldehyde resins, water-soluble melamine-formaldehyde resins, polyethylene glycol, carboxymethyl cellulose and methylcellulose,
   the combined amount of the high polymer and the surface active agent in said aqueous solution applied to said substance being from 0.001 to 0.5% by weight of said substance, and
   drying said substance to remove water to produce particles of said substance having a branched configuration and having a relatively large apparent specific volume.

2. A method according to claim 1, in which the mixing ratio of the water-insoluble vinyl series high polymer and the anionic surface active agent is from 1:10 to 10:1 parts by weight.

3. A method according to claim 1, in which the mixing ratio of the water-soluble synthetic high polymer and the surface active agent is from 1:10 to 10:1 parts by weight.

4. A method according to claim 1, in which a mixture of different water-soluble synthetic high polymers is used, one of which is a urea-formaldehyde resin.

5. A method according to claim 1, in which the anionic surface active agent is selected from the group consisting of alkyl sulphates, alkyl benzene sulphonates, alkyl naphthalene sulphonates, fatty acid salts and resin acid salts.

6. A method according to claim 1, in which the aqueous solution of the anti-caking agent is applied by spraying the solution onto particles of the substance as the particles are moved past a spraying device and the substance is immediately dried.

7. A method according to claim 1, in which the aqueous solution contains from 0.1% to 10% by weight of the anti-caking agent.

TABLE 8

| Surface active agent | Water soluble polymers | Breaking Load in kg. | |
|---|---|---|---|
| | | UF not added | UF added |
| Sodium dodecyl sulfate (SDS) | Polyvinyl-pyrrolidone | 2.8 | 0.6 |
| SDS | Polyethyleneglycol 4000 | 2.8 | 0.5 |
| SDS | Carboxy methyl Cellulose | 2.0 | 0.9 |
| Trimethyloctadecyl-ammonium-chloride | Polyvinylalcohol (PVA) | 2.8 | 1.1 |
| Coconut alkyl betaine | PVA | 3.3 | 0.8 |
| Polyoxyethylene nonylphenyl ether (P=10) | PVA | 3.4 | 0.8 |
| Water only | | 5.0 | |

8. A method according to claim 1, in which the combined amount of the polymer and the surface active agent is from 0.005% to 0.050% by weight of said substance.

9. A method of preventing the caking of urea which comprises spraying onto urea particles an aqueous solution of polyvinyl acetate and sodium dodecyl sulphate, the combined amount of the polyvinyl acetate and the sodium dodecyl sulphate applied to the urea particles being from 0.005% to 0.050% based on the weight of the particles, and then drying the urea particles to remove water to produce urea particles having a branched configuration and having a relatively large apparent specific volume.

References Cited

UNITED STATES PATENTS 3,223,518   12/1965   Hansen _____ 71—64

DONALL H. SYLVESTER, *Primary Examiner.*

R. BAJEFSKY, *Assistant Examiner.*